UNITED STATES PATENT OFFICE.

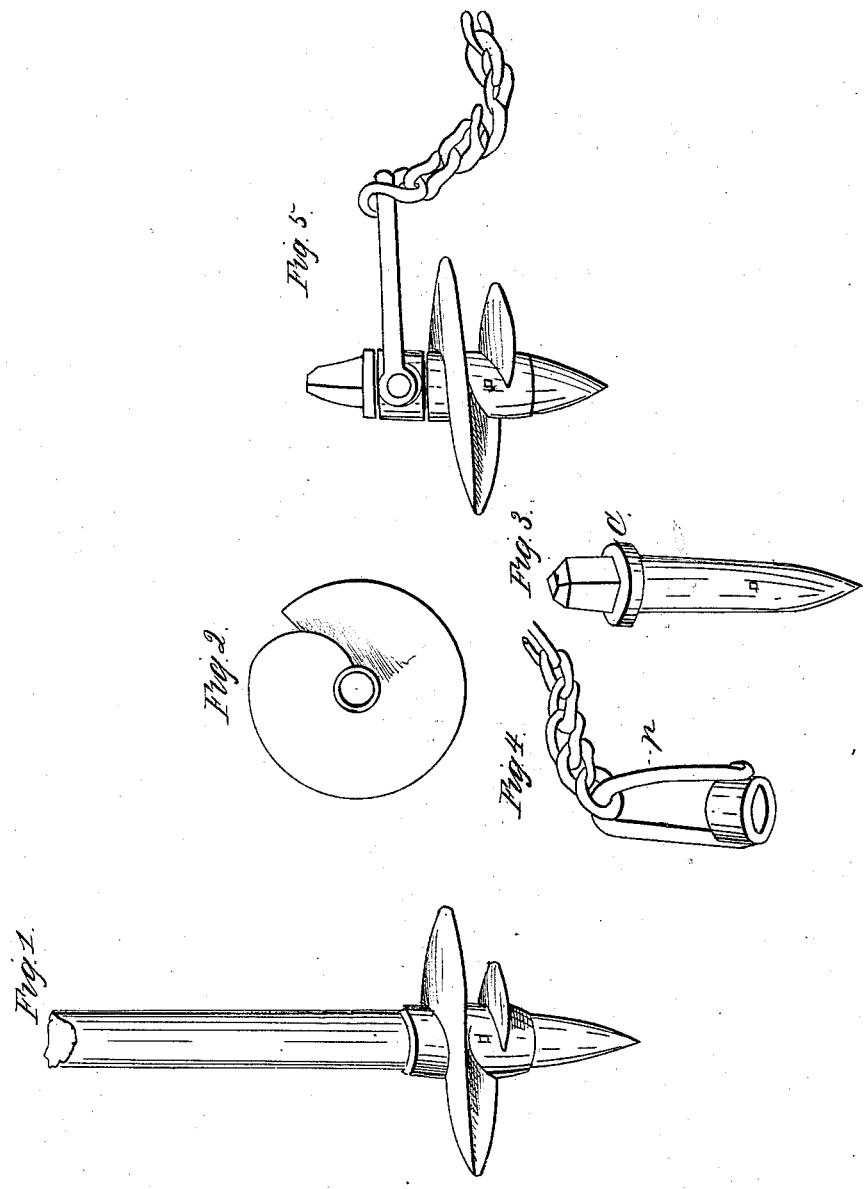

ALEXANDER MITCHELL, OF BELFAST, IRELAND.

METHOD OF OBTAINING FOUNDATIONS AND OF MOORING SHIPS, BUOYS, AND OTHER FLOATING BODIES.

Specification of Letters Patent No. 3,986, dated April 1, 1845.

*To all whom it may concern:*

Be it known that I, ALEXANDER MITCHELL, of Belfast, in the county of Antrim, Ireland, civil engineer, have invented a Method of Obtaining Foundations and of Mooring Ships, Buoys, and other Floating Bodies, of which the following is a specification.

My invention consists in the application of piles, posts, or beams, or metal pins, furnished at their lower ends with a spiral flange, or worm of metal, for the purposes of facilitating their introduction into or extraction from the ground, and of giving them a firmer hold therein; which piles, or mooring chains, with their pins so armed, are also applicable to other purposes, for which other uses I claim them as my present invention under these Letters Patent.

The apparatus which I so employ to give the piles these properties is a broad and short worm, or screw, of cast iron, fitted on the lower extremity of the stick. This worm is a broad flange coiling helically about one and a half turns around a hollow socket, and cast together of one piece: the worm plate thinning off gradually from where it springs from the socket to its outer margin. The circumferential line of the worm describes a double volute in reference to the axis of the socket curving spirally inward toward the center, at both its terminations. Such a form facilitates its cutting through the ground, and with the same view the edge is made more acute on those portions of the curve which run in toward the socket. The socket is a short tube, either cylindrical, conical, or prismatic, which receives the lower end of the pile, shouldered down, and shaped to enter and fill its cavity, and having its extremity passing a little through the socket, shod with a conical iron ferrule to enable the instrument more readily to penetrate the ground.

Two or more through-pins driven through the timber and holes in the socket, and riveted at the ends, secure the worm to the pile. The piles so armed can be readily inserted into penetrable ground by setting them vertically in their assigned places, their points downward, and turning them around by means of cross levers. In the same way, by a reverse rotation, they can be readily withdrawn when occasion requires.

I employ the same kind of worm as above described, fitted with a central pin of iron, and a shackle on a loose collar, to obtain through a strong chain a secure and convenient mooring for buoys and other floating bodies. The central iron pin for this form of the apparatus is pointed below and fits into the tapering cavity of the socket, the pointed end passing through; and above the upper margin of the socket it stands up so far as to admit on the upper part of the shaft of the pin, which is cylindrical, a strong collar of iron, which turns easily upon it, betwixt the margin of the socket and a projecting shoulder on the pin. The central pin and the socket are fixed to each other by strong through-pins. The head of the central pin above the shoulder is made pyramidal or prismatic to receive the key which is used to turn it into or out of the ground.

The loose collar has two projecting journals forged on it to receive the eyes of a shackle by which a mooring chain is connected with it. This loose collar allowing the pin to turn within it while the worm is being screwed into or out of the ground by means of the key, prevents any impediment to the operation from the chain. The key for acting on this screw-mooring is a socket of iron fitting upon the head of the central pin, and having a shaft of suitable length for the proposed depth of water and of insertion into the ground. I find it convenient to make the shaft for the key of wrought iron tube, in about ten-feet lengths, four to six inches diameter, and one quarter to three-eighths thick. These tubes, filled with wood inserted wedgewise, are solid and light, and resist torsion with sufficient power. The lengths of shafting may be conveniently jointed together by a short pin or piece of smaller tube fitting within the outer tube at one end, and projecing eight or ten inches out of it, so as to receive upon it the end of the next piece of shafting: fixed and movable steel pins passed through the outer and inner tubes will hold them together, but to connect the lengths more securely to resist torsion it will be advisable to scarf or notch the ends of the outer tube so as to fit like teeth into each other.

To obtain a hold of the shaft for the purpose of turning in or out the mooring screw it may be necessary to weld or pin upon the shaft at convenient distances for allowing the cross levers to be worked, angular bosses on which a plate key will fit, and can be passed over from one to another.

See drawings annexed.

Figure 1 a screw pile. Fig. 3, pin or shaft of the mooring screw. Fig. 4, loose collar, *p*, shackle. Fig. 2 worm or screw. Fig. 5, mooring screw-pin and chain.

The worms for the piles, or for the mooring-screws, may, of course, be varied in dimensions, say from two to five feet, or more or less, according to the nature of the ground, or the degree of resistance called for by the work in which they are employed.

I declare my invention under the present Letters Patent, to consist, in the application to the lower end of the wooden pile, or to a metal pin or shaft, of a broad metal screw or worm, for the purpose of enabling such a pile or pin to be inserted into, or extracted from the ground by causing it to turn upon its axis by means of cross-levers, when it is placed with its point directed upon penetrable ground; and

I claim under the privileges of the before-mentioned Letters Patent—

Piles, pins or shafts, so armed with broad metal worms or screws, whether the same be employed for piling ground for the support of buildings or embankments, or to obtain a secure hold of the ground for the purposes of mooring or holding fast ships and other floating or stationary bodies.

A. MITCHELL.

Witnesses:
 JAS. R. GARRETT,
 THOMAS MITCHELL.